(12) United States Patent
Vikramaditya et al.

(10) Patent No.: US 7,889,450 B2
(45) Date of Patent: Feb. 15, 2011

(54) REDUCED READ/WRITE TRANSITION OVERHEAD FOR STORAGE MEDIA

(75) Inventors: Barmeshwar Vikramaditya, Eden Prairie, MN (US); Bruce Douglas Buch, Westborough, MA (US); Jon Karsten Klarqvist, Roseville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 194 days.

(21) Appl. No.: 12/267,330

(22) Filed: Nov. 7, 2008

(65) Prior Publication Data

US 2010/0118429 A1    May 13, 2010

(51) Int. Cl.
G11B 5/09 (2006.01)
G11B 5/596 (2006.01)
(52) U.S. Cl. ..................... 360/51; 360/77.08
(58) Field of Classification Search ............ None
See application file for complete search history.

(56) References Cited

U.S. PATENT DOCUMENTS 7,643,235 B2 * 1/2010 Erden et al. .............. 360/51
2010/0128384 A1 * 5/2010 Shibano .................... 360/75

* cited by examiner

*Primary Examiner*—Daniell L Negrón
*Assistant Examiner*—Regina N Holder
(74) *Attorney, Agent, or Firm*—Westman, Champlin & Kelly P.A.

(57) ABSTRACT

A technique is described for reducing overhead in a magnetic medium utilizing interspersed timing synchronization fields. In particular, a reader reads timing synchronization fields interspersed within data fields of the medium to obtain timing measurements. The reader is separated from a writer by a distance greater than a distance of the reader to traverse a select timing synchronization field. As such, the writer may perform a direct current (DC) write to the medium to suspend transitional write operations while the reader is reading the select timing synchronization field, and/or while the writer is over a unipolar field (e.g., a timing synchronization field).

18 Claims, 7 Drawing Sheets

REDUCED READ/WRITE TRANSITION OVERHEAD FOR STORAGE MEDIA

CROSS REFERENCE TO RELATED APPLICATIONS

The present application is related to the following commonly-owned, copending U.S. Patent Applications, the content of each of which are incorporated herein by reference:

U.S. Publication No. US2008/0080082, published Apr. 3, 2008, by Mehmet Fatih Erden et al., entitled SYNCHRONIZATION FOR DATA COMMUNICATION;

U.S. patent application Ser. No. 12/267,168, filed on Nov. 7, 2008, by Barmeshwar Vikramaditya et al., entitled WRITE CLOCK CONTROL SYSTEM FOR MEDIA PATTERN WRITE SYNCHRONIZATION;

U.S. patent application Ser. No. 12/266,677, was filed on Nov. 7, 2008, by Bruce Douglas Buch et al., entitled A WRITE COMPENSATION SYSTEM;

U.S. patent application Ser. No. 12/267,234, filed on Nov. 7, 2008, by Bruce Douglas Buch et al., entitled MEASUREMENT OF ROUND TRIP LATENCY IN WRITE AND READ PATHS;

U.S. patent application Ser. No. 12/267,215, filed on Nov. 7, 2008, by Bruce Douglas Buch et al. for ELIMINATING SECTOR SYNCHRONIZATION FIELDS FOR BIT PATTERNED MEDIA; and U.S. patent application Ser. No. 12/267,305, filed on Nov. 7, 2008, by Bruce Douglas Buch et al. for INTERSPERSED PHASE-LOCKED LOOP FIELDS FOR DATA STORAGE MEDIA SYNCHRONIZATION.

BACKGROUND OF THE INVENTION

The invention relates generally to data storage media devices, e.g., disk drives and related technologies.

Data storage media, such as disk drives, may comprise one or more magnetic disks on which information may be stored as corresponding magnetic polarities. For example, a series of information bits, e.g., "1010" may be stored on the magnetic media as magnetic transitions corresponding to +1, −1, +1, −1. Conventionally, using what is known as "continuous magnetic media," there is no strong requirement for the accuracy of the absolute positions of the written data positions. With continuous media, preambles, or training patterns, are written as part of the write operations, to depict the start of a data sector and the start of the data within the sector. In addition, the training patterns provide timing information for read clock synchronization, since the training patterns are written at the same time as the data using a fixed frequency write clock. As sectors are re-written, the starting points may vary slightly, and thus, read operations must re-synch at the start of each sector to ensure alignment of the read operation to the start of the data as well as the timing of the data.

With continuous magnetic media, the system reads a given sector by locating the associated training pattern and synchronizing a variable frequency read clock to the frequency and phase of the pattern as read from the medium. The synchronizing of the read clock is required to overcome differences in disk speed between the read and write operations, differences in fly height, and so forth. At the start of the sector the read clock is brought into frequency and phase synchronization with the recorded training pattern by a read channel digital phase lock loop. After the read clock is synchronized to the training pattern data, the read clock is synchronous with the data, which was recorded at the same time using the same fixed-frequency write clock.

Bit patterned media ("BPM"), on the other hand, is a relatively new technique used in magnetic data storage that provides patterns of magnetic regions (e.g., "dots" or "islands") within non-magnetic material. In contrast to conventional continuous magnetic media, for efficient use of BPM capacity, write operations to BPM must be aligned such that write current transitions are synchronized with the patterns of dots. Synchronization is also required for reading the magnetic states of the dots.

One solution to synchronize a write clock is described in above-mentioned U.S. patent application Ser. No. 12/267, 305. As described therein, Phase-Locked Loop (PLL) synchronization fields may be interspersed between servo sectors to provide media-referenced timing for write operations. For example, a write clock controller may be used to control the phase and frequency of a write clock based on the PLL fields, and the updated write clock timing may then be coasted during the interval between PLL fields.

In particular, a system using interspersed PLL fields to attain write synchronization generally needs to periodically read PLL fields during a write operation. Because the reader and writer are typically separated by a distance greater than the PLL field length, the writer is generally over a data field when the reader is over a PLL field. One technique that may be used in this situation is to simply continue to write data while the PLL field is read, requiring a read-while-write operation. This results, however, in significant effects of write coupling, where radiated and reactively coupled artifacts of the write signal corrupt the sensing of the signal to be read. While techniques may be employed to minimize the coupling enough to enable a relatively clean read of a PLL field, the techniques are complex. Conversely, as described in the above-mentioned U.S. patent application Ser. No. 12/267, 305, a second approach is to disable writing as the reader approaches the PLL field, and to resume writing after the PLL field has been read. This second method incurs the format overhead of allowing for lengthy read-to-write mode operation transitions, where write current is turned off and then restored to a programmed write current magnitude (often referred to as "ramp up").

SUMMARY OF THE INVENTION

The present invention is directed to a technique for reducing overhead in a magnetic medium utilizing interspersed timing synchronization fields. In particular, a reader reads timing synchronization fields interspersed within data fields of the medium to obtain timing measurements. The reader is separated from a writer by a distance greater than a distance of the reader to traverse a select timing synchronization field. As such, the writer may perform a direct current (DC) write to the medium to suspend transitional write operations while the reader is reading the select timing synchronization field, and/or while the writer is over a unipolar field (e.g., a timing synchronization field).

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
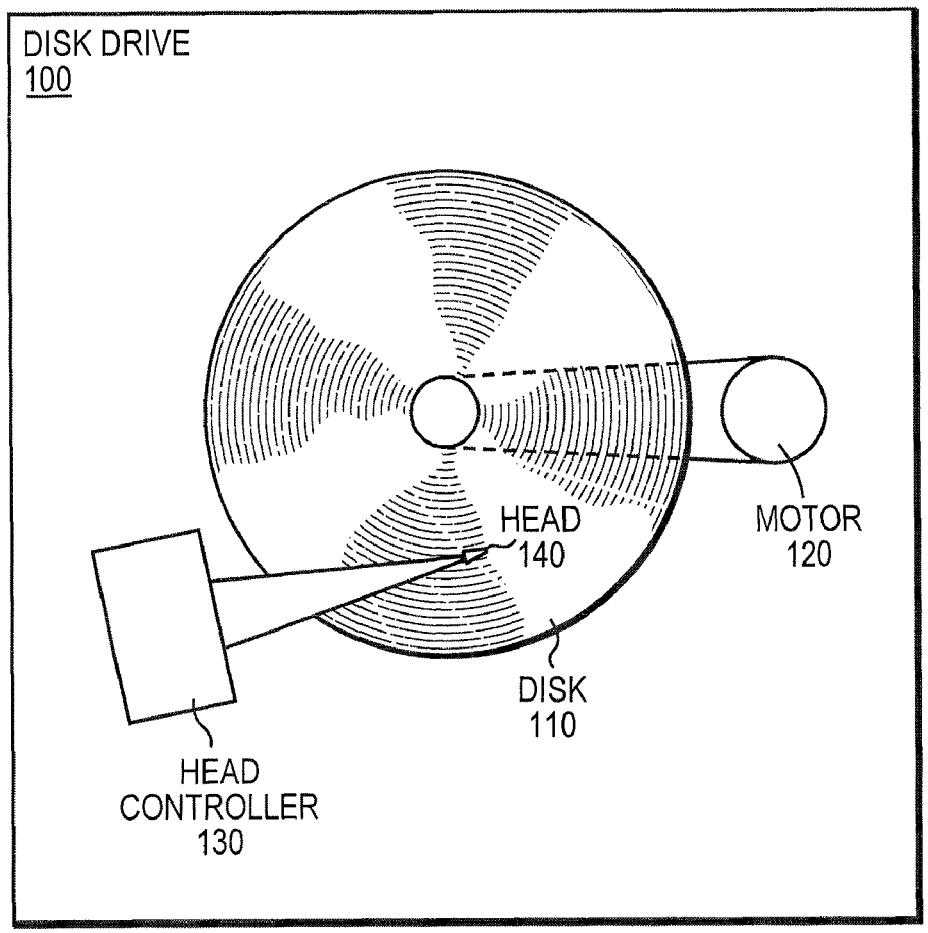
FIG. 1A illustrates an example disk drive.

Briefly, FIG. 1A illustrates an exemplary disk drive 100 that comprises a magnetic recording medium, such as a magnetic disk 110, that advantageously may be used in accordance with the illustrative embodiments. The disk 110 may comprise, for example, a magnetic recording layer deposited on a substrate, as will be understood by those skilled in the art. The disk also may contain other magnetic or non-magnetic layers, such as a soft magnetic underlayer, exchange-coupled layer, lubrication layer, carbon overcoat, etc., which are not explicitly shown. The recording layer may be fabricated using various ferromagnetic materials and alloys, e.g., embodied as thin-film or particulate media, and may be deposited on the substrate using a variety of deposition techniques known in the art, in particular, in accordance with bit patterned media (BPM) as described herein. The substrate also may be constructed from various materials, such as glass or conventional aluminum-magnesium substrates used for magnetic disks. The disk drive 100 may also comprise a motor 120 used to spin the disk 110, as well as a head controller 130 to control a read-write head 140, as will be understood by those skilled in the art and as described herein (e.g., to control clock synchronization).

Figure 1B:
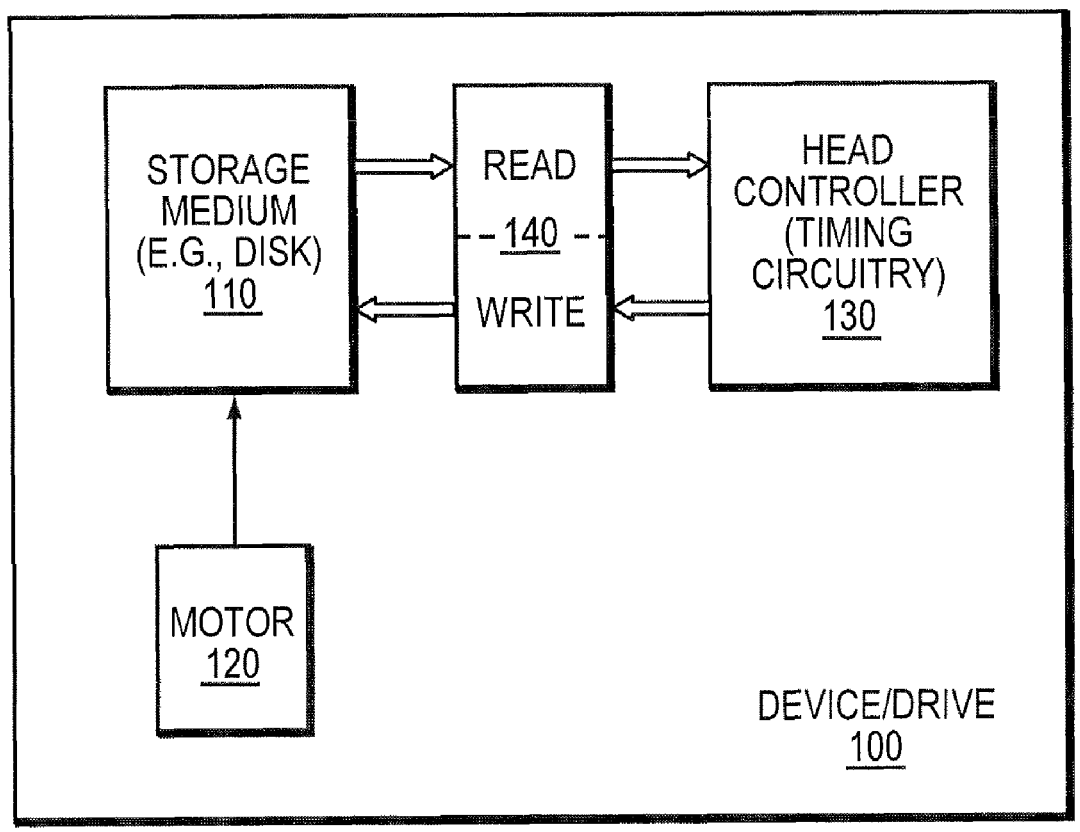
FIG. 1B illustrates an example block diagram of the disk drive of FIG. 1A.

Referring now to FIG. 1B, which has elements in common with FIG. 1A, a read-write head 140 reads information from and writes information to the disk 110, which is spun by the motor 120. The head controller 130 (e.g., circuitry used to control the track, position, timing, phase, etc. of the reading and writing operations and circuitry) receives information (e.g., data or timing information) from the read-write head 140, and provides information to the read-write head, as described herein.

Illustratively, the media (e.g., disk 110) is arranged as BPM, which provides patterns of magnetic regions (e.g., "dots" or "islands") within non-magnetic material (e.g., "troughs"). For efficient use of the BPM storage capacity, write operations to BPM should be aligned such that write current transitions are synchronized with the patterns of dots, i.e., efficient use of BPM capacity requires tight synchronization of the write clock to the phase and frequency of the media itself (i.e., to the dots). As noted above, the write operations, if not synchronized to the dots, may be attempting to write between the dots on the non-magnetic areas of the media or dots may be skipped, thereby reducing the effective storage capacity of the media.

According to above-mentioned U.S. patent application Ser. No. 12/267,305, techniques are provided for sampled observation of write clock timing offset relative to dot timing when writing, where the timing signals are read from respective phase-lock loop (PLL) fields. A control scheme adjusts the phase of the write clock used in the subsequent data field for writing discerned from calibrations, and, through continually-applied injections, adjusts the frequency of the write clock based on the timing offsets, which are determined using the signals previously read from the PLL fields. The write clock timing then coasts in between PLL fields, while a write operation continues with a write clock having updated phase and frequency. When the reader arrives at a next PLL field, data writing is suspended while timing information is extracted from the PLL field.

Figure 2:
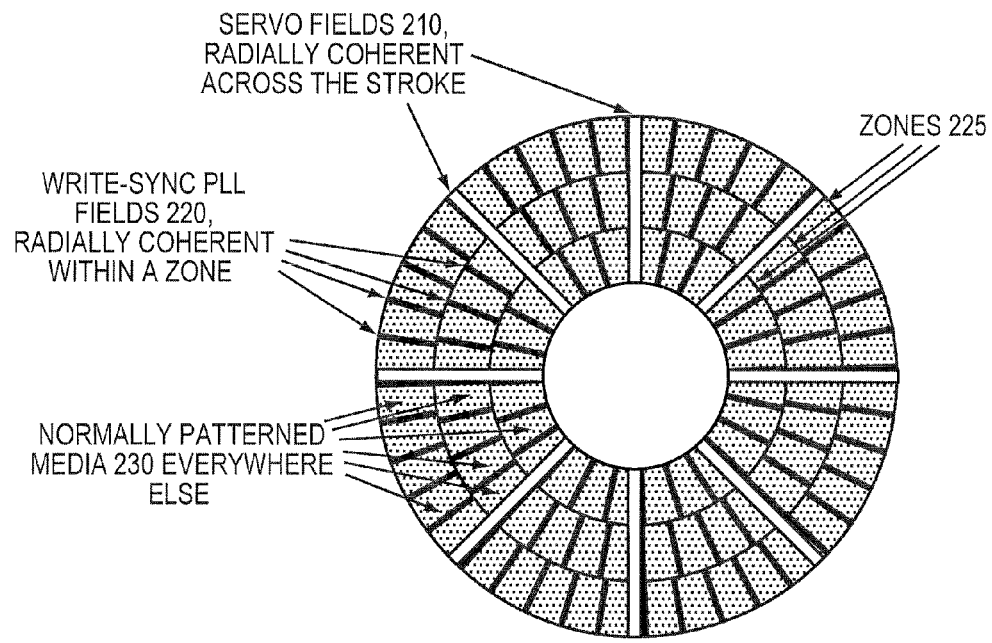
FIG. 2 illustrates an example view of information stored on a media having interspersed PLL fields.
Figure 3:
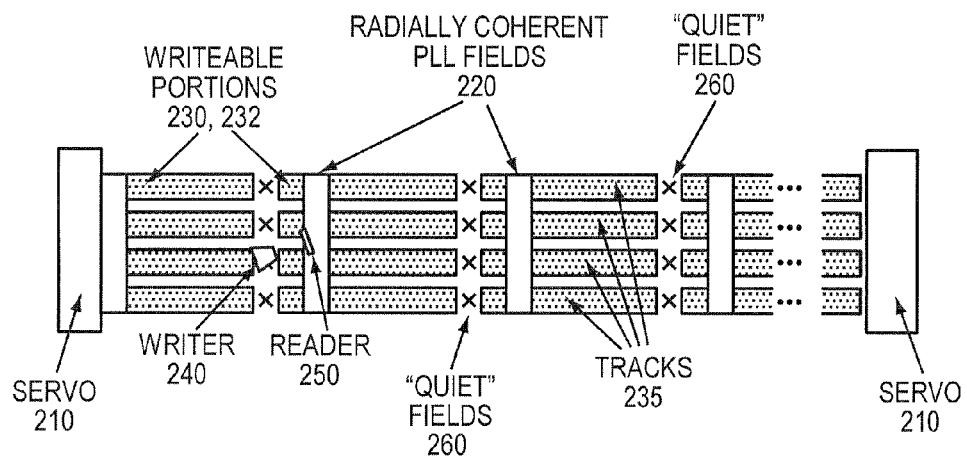
FIG. 3 illustrates an above view of the format of an example printed media to support the logical format shown in FIG. 2.

FIG. 2 illustrates the format of BPM (e.g., disk 110) to support the logical format shown in FIG. 3. For sake of context, FIG. 2 shows various servo fields/areas 210 and PLL fields 220, but makes no assumptions about servo field position relative to the PLL fields. It is assumed, for now, that the PLL fields 220 occur more frequently than the servo fields.

The servo fields 210 are radially coherent across the disk surface. In the example, the PLL fields 220 are radially coherent within a "zone" 225. Within a zone, the same number of dots occur between PLL fields, and thus, the radially coherent PLL fields are read at regular dot intervals (where being radially coherent within a zone implies that the same signal may be read from a read head position anywhere across the zone). Since the PLL fields provide a timing reference for the zone, this per-zone radial coherence is consistent with the patterning of data dots for constant-density recording per-zone. In other words, each data portion 230 between a pair of PLL fields 220 within a zone illustratively comprises the same number of dots, spaced at a same linear frequency according to the radial position of the zone on the underlying disk surface. Illustratively, the dot pattern of the PLL fields 220 provide readback of a signal that is recorded with a predetermined number of dots per cycle (e.g., 1, 1, −1, −1, etc.).

The data are written to and read from the regions 230 between the interspersed PLL fields. While making these PLL fields aligned to logical block boundaries would simplify format control, such alignment is not necessary. Rather, in the example, the data areas are interrupted with the permanently written (e.g., "read-only"), radially coherent PLL fields 220. The "X's" illustrate unused areas in the format that roughly match the length of the interspersed PLL fields. These "quiet" fields 260 correspond to the position of the writer 240 when the reader 250 is over the radially coherent PLL fields 220.

FIG. 3 illustrates an example view of information stored on a BPM having interspersed PLL fields. In particular, between conventional servo fields 210, one or more PLL fields 220 may be interspersed at predefined intervals within writeable fields 230 of tracks 235 (e.g., four shown). A read-write head 140 is illustrated, with a writer 240 and a reader 250 that are separated by a known distance. Notably, an illustrative PLL field comprises a known pattern that produces a periodic read-back waveform with a known period of four dots, e.g., ++−− ("bipolar") or ++00 ("unipolar"), referred to as a 4T-per-cycle dot pattern.

As noted, when writing data fields 230, the signals read from the interspersed PLL fields 220 are sampled for use in updating the phase and frequency of the write clock relative to the media. Data writing is suspended during the reading of the PLL fields, to obviate the complications of read-while-write operations and circuitry. Thereafter, data writing is resumed in sections 232 of the data fields, which are also referred to herein as "runt" data fields. Note that the length of the runt fields 232 roughly corresponds to the nominal writer-reader downtrack separation (i.e., the downtrack distance between writer 240 and reader 250).

Figure 4:
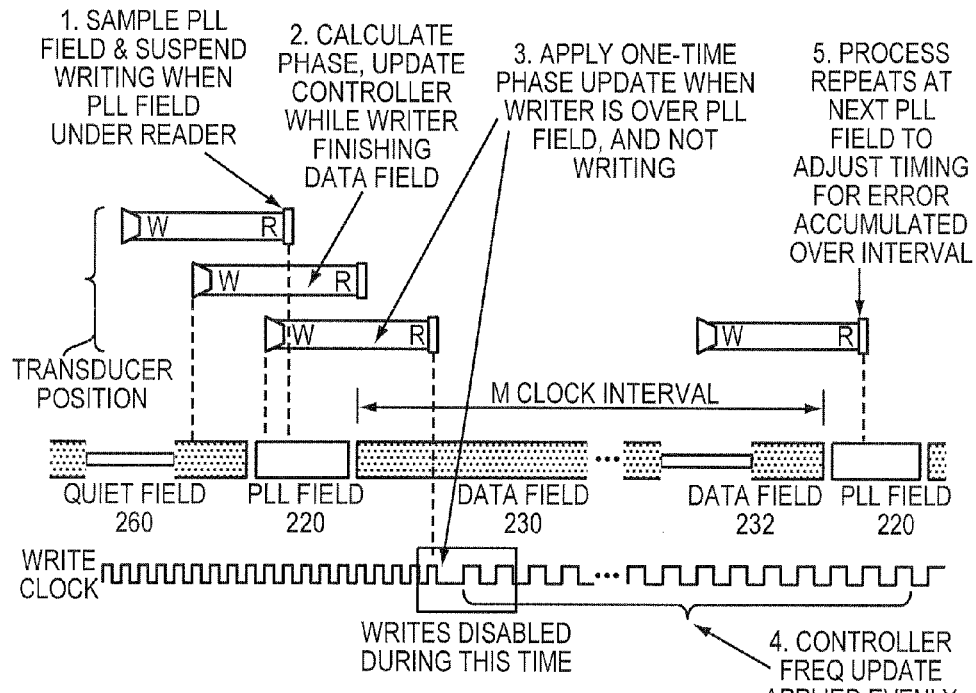
FIG. 4 illustrates an example sequence of events for write clock control as relative to the format.

FIG. 4 illustrates the sequence of events for write clock control relative to the format of the media. First ("1"), a PlLL field 220 is read by reader 250, and data writing is suspended (thus, quiet field 260). Second, write clock phase corrections are calculated, and third, the write clock phase and frequency control is updated. Illustratively, these second and third steps may be executed immediately after PLL field 220 is read, and before the write of the data field 230. Another implementation, as shown in FIG. 4, may complete these steps during completion of writing data field 230, or may wait until the writer is over the PLL field 220 when data writing is suspended to apply the phase and frequency control update ("2" and "3"). The controller applies a phase update as a step and a frequency update (seen as "4") over the entire interval between PLL fields as a continuously applied phase offset, until the process is repeated ("5") at the next PLL field 220.

Figure 5:
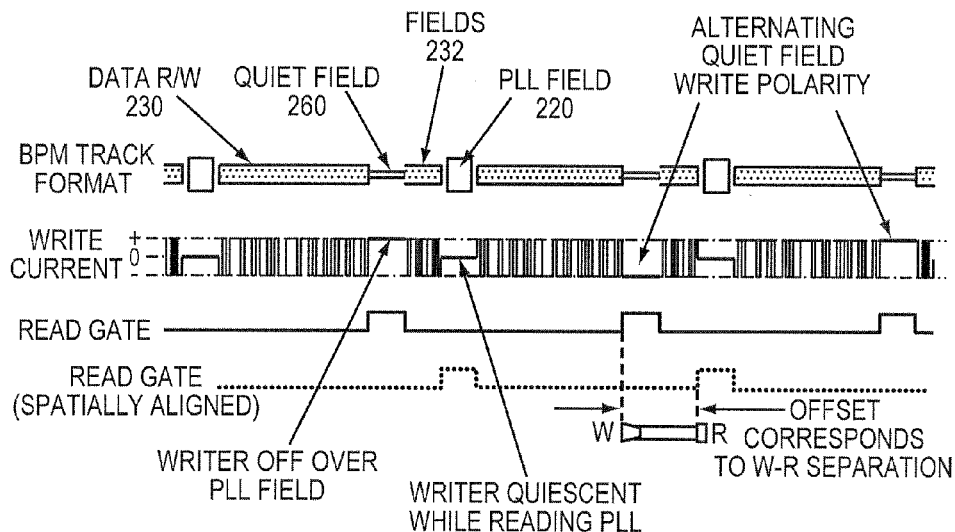
FIG. 5 illustrates an example of read and write activity when writing according to the track format of the present invention.

Referring to FIG. 5, the write current activity (of writer 240) is shown for writing the span of media, and the reader 250 activity is shown referenced to the timing of the writer (solid line) and also as spatially referenced to the track format (dotted line). Notably, the difference between the time and spatially-referenced waveforms is due to the writer-reader ("W-R") separation mentioned above. FIGS. 6-10 detail each step of the process to generate the write current activity as summarized in FIG. 5 in particular illustrating the read/write activity as a head traverses the novel format during a write operation. The steps depict a preferred sequence of detecting phase and frequency offsets and applying corrections to write clock timing. In these diagrams, the symbol referencing the read-write head consists of "W" and "R" which represent respectively the writer 240 and reader 250 elements of the head and an illustrative spacing therebetween. The head is depicted as traversing the media from left to right, with the reader ahead of the writer, and arrows beneath the writer and reader show their positions relative to the format. As noted, the downtrack separation between the reader and writer is non-zero.

Figure 6:
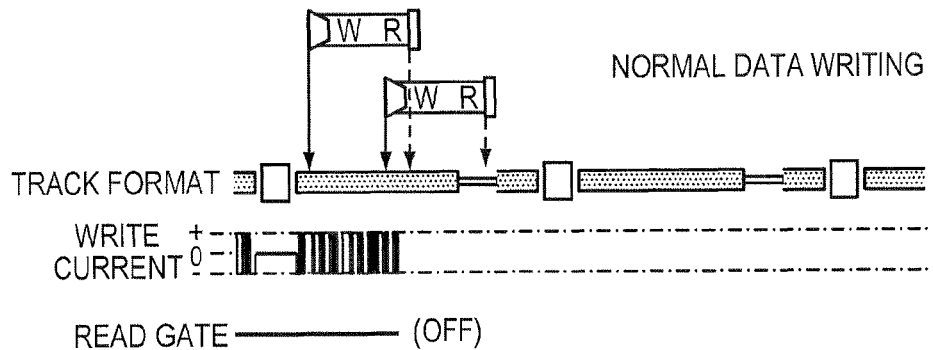
FIGS. 6-8 and 10A-11 further illustrate the novel concepts of the present invention, detailing example steps of the process as summarized in FIG. 4 that generated the illustration in FIG. 5.

In FIG. 6, two head positions are shown where data writing commences un-interrupted. In both cases, the writer is over the data area 230, and the reader is either also over the data area, or over the quiet field 260. Note that the bias (or read) current may be turned off (i.e., no reading is taking place), though those skilled in the art will appreciate that bias current may be left on without reading any data (i.e., ignoring the read signal to thus suspend reading operations).

Figure 7:
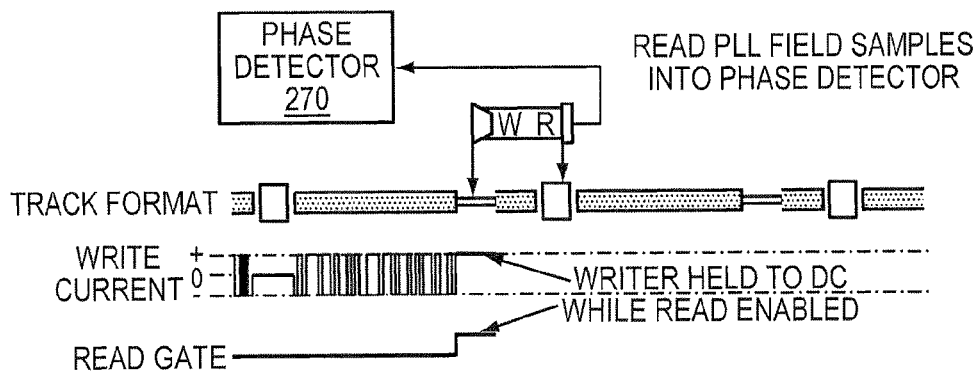

Next, as shown in FIG. 7, when the reader enters the PLL field 220, reading is enabled and the signals are read from the PLL field. During this time, according to the present invention, the writer is held to a DC value to prevent write transitions from coupling into the read signal at the reader. This DC-writing during the time the reader is over the PLL field creates a "quiet field" 260 (FIG. 2) within the data field where transitional writing is suspended for a field length roughly the same as the PLL field itself. The offset between the quiet field and the PLL field corresponds to the physical downtrack separation between the writer and the reader.

Figure 9:
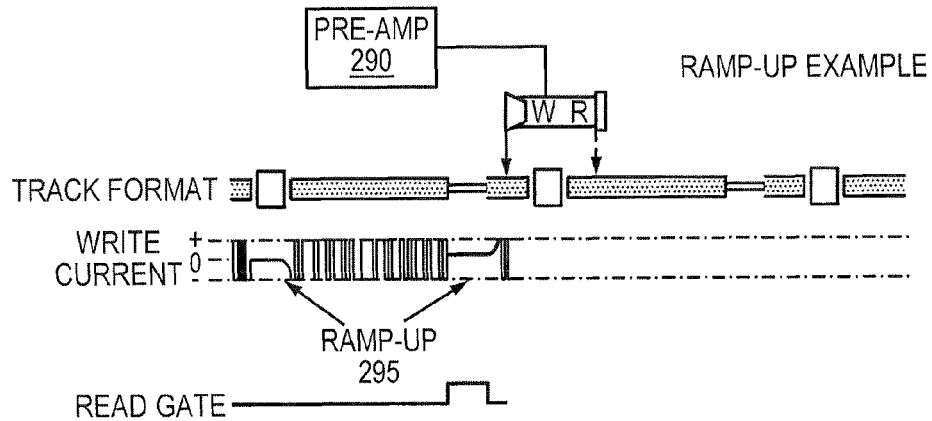
FIG. 9 illustrates an example of a ramp-up problem that may be solved by utilizing the present invention.

In particular, the writer current is held at DC when the reader is reading the PLL field to eliminate reactive (e.g., capacitive/inductive) coupling while also eliminating the format hit of write current turn-on/off delays (e.g., "ramp up" of pre-amps, shown in FIG. 9 below). This suspension of data writing is what creates the quiet field. The polarity of the DC value applied over the respective quiet fields may be alternated (as shown in FIG. 4) to mitigate baseline shift, and may also be alternated on adjacent tracks to prevent read/write head shields (not shown) which span many tracks from seeing a polarity "speed bump" (i.e., where the polarity for each quiet field is the same, thus creating a regular interval of either positive or negative magnetization, which may produce undesired side effects during reading operations). By alternating the polarity as shown in FIG. 4, the undesirable effects of a polarity speed bump are greatly reduced. (Note that when reading back the written data, the read head 250 reads through the quiet area 260, but discards any detected "data," thereafter splicing together the data 230 around the quiet fields. Also, since the data in the quiet fields are known (e.g., all "data" 1's or all 0's), a Viterbi trellis can be closed and opened from known states to assist in error correction, as may be appreciated by those skilled in the art.

Figure 8:
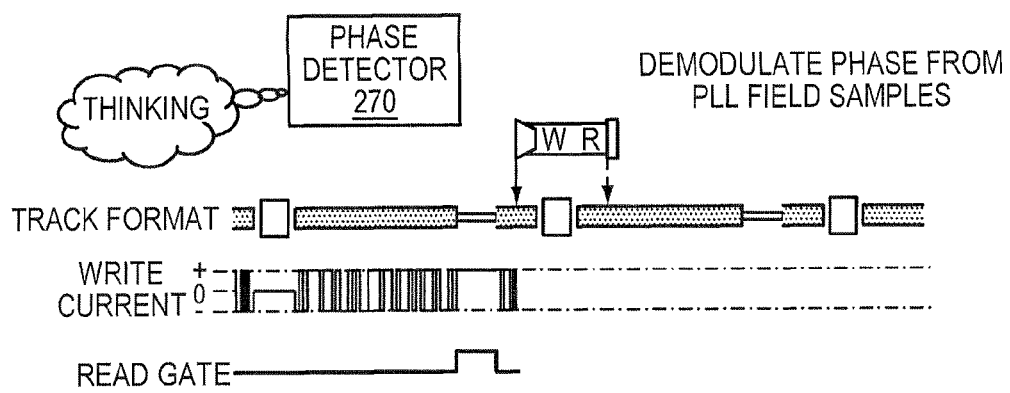

Once the PLL field has been read, writing resumes in the "runt" data field 232 between the quiet field 260 and the PLL field 220, as depicted in FIG. 8. During this time, the phase detector processes the signals read from the PLL field and computes the phase of the write clock relative to the media. Alternatively, as mentioned above, the updates to the clock may be made while the reader is within the PLL field, and as such, the clock of the runt data field 232 is an updated clock. (Note also, that where the separation between the writer and reader is not greater than the PLL field length, runt data field 232 need not be present.)

Notably, the start of the runt data field is not affected by any ramp-up problems due to the writer 240 having remained on (DC writing) during the PLL read, in accordance with the present invention. FIG. 9 briefly illustrates a conventional pre-amp ramp up transition, and the associated overhead. In particular, pre-amp 290 is off during the quiet field 260, and then when instructed to begin writing data, requires a certain ramp-up delay (to bring writing power back to operating levels), resulting in a ramp-up overhead 295 of potentially several dots, and thus, reducing the useable storage capacity of the runt field 232.

Figure 10A:
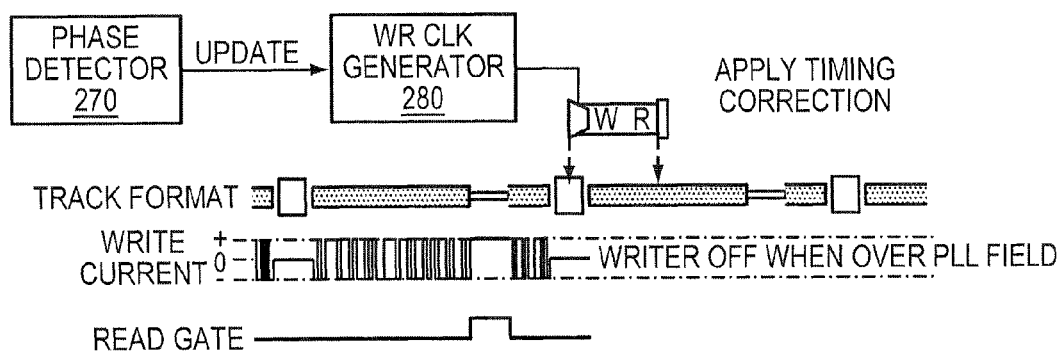

In FIG. 10A, when the writer 240 traverses the PLL field 220, write current may be turned off. During this time, a write clock generator 280 updates the write clock based on the phase difference of the write clock relative to the media, to synchronize the write clock to the media. An advantage of updating the write clock timing when the writer is off is that it negates the effect of any discontinuities that may result from artifacts of the implementation when applying these corrections. This embodiment is particularly useful when PLL fields (or other fields not to be written) are bipolar, having values that may become corrupted by overwriting DC values.

Figure 10B:
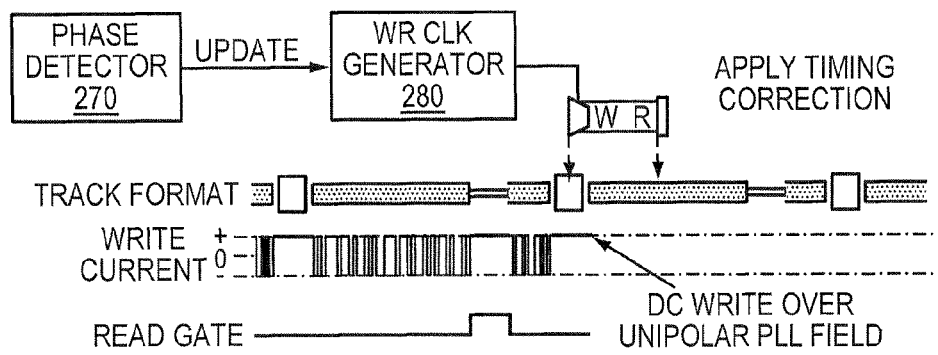

Notably, in the event the PLL fields 220 are "unipolar" fields, that is, comprise patterns of written dots of a same polarity (e.g., timing fields having written/magnetized dots of a same polarity and missing dots to create the timing pattern), then write current corresponding to that same polarity may be left on as shown in FIG. 10B. This refreshes the field to its initially formatted state, rather than potentially corrupting it (when not read-only), and results in the same benefits obtained from the DC-write of the quiet fields as described above. Namely, ramp-up problems are avoided when exiting the unipolar fields and initiating writing. Whether a field is unipolar may be determined by associated circuitry (e.g., head controllers) with knowledge of unipolar field locations (e.g., the timing synchronization or PLL fields).

Figure 11:
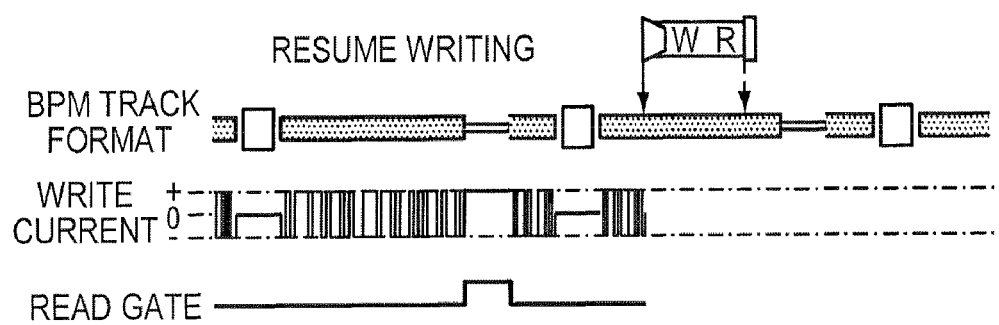

Finally, in FIG. 11, after the writer is past the PLL field, data writing resumes with the updated write clock. The sequence of steps is repeated over respective interspersed PLL fields. Alternatively, as mentioned above, write clock phase corrections may be calculated and the write clock phase and frequency control may be updated immediately after PLL field 220 is read (or during the traversal of the PLL field), and before the write of the data field 230, such that runt data field 232 is written with an updated clock, accordingly.

Notably, since ramp-up still applies when resuming writing after a PLL field over which the writer is turned off (an alternative to that mentioned above in FIG. 10B), it may be beneficial to begin the ramp-up period slightly before reaching a first writeable dot after a PILL field. One manner is to provide a buffer between the PLL field and the first writeable dot, while another is to begin the ramp-up while the writer is still within the PLL field (assuming the risk of damage to the pre-recorded PLL field is minimal during ramp-up current). Note further that beginning ramp-up while the writer is over a quiet field, i.e., the reader is still over a PLL field, is not preferred, since the ramp-up within the quiet fields may adversely effect the sensitive timing measurements of the reader.

According to the present invention, therefore, techniques are described to suspend the flow of data to the writer when reading a PLL field and instead send a DC value. Rather than exit the write mode, the write writes the DC value, and coupling between the reader and writer does not adversely affect the reading of timing information from the signal read from the PLL field. Advantageously, this obviates the need to transition between read and write modes and to thus disable and enable write current, while eliminating writer-to-reader coupling since no transitions are written while the PLL fields are being read (i.e., no read-while-write operations). In other words, noise from transitional writes are prevented from interfering with the reading of the timing synchronization fields, and pre-amp "ramp up" (read/write transition time) is eliminated for writing data to the additional area. Also, the same technique may be applied when the writer is located over any unipolar field (i.e., DC writing the same polarity as the unipolar field) to avoid ramp-up problems when exiting a unipolar field.

While there has been shown and described an illustrative embodiment, it is to be understood that various other adaptations and modifications may be made within the spirit and scope of the present invention. For example, the invention has been shown and described herein for use with particular forms of magnetic media. However, the invention in its broader sense is not so limited, and may, in fact, be used with other suitable data storage forms (e.g., with conventional magnetic media or discrete track recording, "DTR"). Also, while the invention has been shown using various distances, tolerances, layouts, etc., other values/layouts may be used in accordance the present invention where applicable.

In particular, while the above description has shown and illustrated techniques applicable to "reader-before-writer" implementation, it may be appreciated that similar techniques may be applied to "writer-before-reader" implementations, where the writer traverses a field before the reader. In this instance, the quiet fields may be located shortly after the interspersed PLL fields, and the writer may still be held to a DC-value accordingly.

The foregoing description has been directed to specific embodiments of this invention. It will be apparent, however, that other variations and modifications may be made to the described embodiments, with the attainment of some or all of their advantages. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for reducing overhead in a data storage medium utilizing interspersed timing synchronization fields, the method comprising:
    reading, by a reader, timing synchronization fields interspersed within data fields of the medium to obtain timing measurements, the reader being separated from a writer by a distance greater than a distance of the reader to traverse a select timing synchronization field;
    performing a direct current (DC) write to the medium to suspend transitional write operations while the reader is reading a timing synchronization field; and
    writing data to an additional area after the DC write and before the reader reaches the select timing synchronization field.

2. The method as in claim 1, further comprising:
    writing data to the additional area based on timing measurements obtained from a previous timing synchronization field.

3. The method as in claim 1, wherein the DC write establishes a constant magnetic polarity in an area covered by the writer while the reader is in a timing synchronization field.

4. The method as in claim 1, further comprising:
    alternate polarities of each DC write.

5. The method as in claim 1, further comprising:
    alternating polarities of DC writes of adjacent tracks of the medium.

6. The method as in claim 1, wherein the DC write prevents write transitions from interfering with reading the select timing synchronization field.

7. The method as in claim 1, wherein the writer comprises a pre-amp, the method further comprising:
    maintaining power at the pre-amp of the writer while the reader is reading a timing synchronization field.

8. The method as in claim 1, wherein the data storage medium is a magnetic storage medium.

9. The method as in claim 1, wherein the timing synchronization fields are phase-locked loop (PLLP) fields.

10. An apparatus for reducing overhead in a data storage medium utilizing interspersed timing synchronization fields, the apparatus comprising:
    a reader configured to read timing synchronization fields interspersed within data fields of the medium to obtain timing measurements;
    a writer configured to write data to the medium, the writer being separated from the reader by a distance greater than a distance of the reader to traverse a select timing synchronization field; and
    a read-write head controller configured to control the reader and the writer, the head controller configured to direct the writer to i) perform a direct current (DC) write to the medium to suspend transitional write operations while the reader is reading a timing synchronization field and ii) to write data to an additional area after the DC write and before the writer reaches the select timing synchronization field.

11. The apparatus as in claim 10, wherein the head controller is further configured to direct the writer to alternate polarities of each DC write.

12. The apparatus as in claim 10, wherein the head controller is further configured to direct the writer to alternate polarities of DC writes of adjacent tracks of the medium.

13. The apparatus as in claim 10, wherein the DC write prevents write transitions from interfering with reading the select timing synchronization field.

14. The apparatus as in claim 10, further comprising:
    a pre-amp associated with the writer, wherein the pre-amp maintains power during the DC write while the reader is reading a timing synchronization field.

15. The apparatus as in claim 10, wherein the apparatus is a disk drive.

16. The apparatus as in claim 10, wherein the data storage medium is a magnetic storage medium.

17. The apparatus as in claim 10, wherein the timing synchronization fields are phase-locked loop (PLL) fields.

18. A system, comprising:
- a data storage medium having interspersed timing synchronization fields interspersed within data fields of the medium;
- a read-write heading having a reader and a writer, the reader and the writer being separated from each other by a distance greater than a distance of the reader to traverse a select timing synchronization field prior to the writer reaching the select timing synchronization field; and
- a read-write head controller configured to control the reader and the writer, the head controller configured to obtain timing measurements by reading the timing synchronization fields, the head controller further configured to write data to the medium, and to perform a direct current (DC) write to the medium to suspend transitional write operations while the reader is reading a timing synchronization field and to write data to an additional area after the DC write and before the writer reaches the select timing synchronization field.

* * * * *